US008315046B2

(12) United States Patent
Cooper

(10) Patent No.: US 8,315,046 B2
(45) Date of Patent: Nov. 20, 2012

(54) MID-KEYBOARD-MONITOR COMPUTER-BASED AUDIO I/O DEVICE

(75) Inventor: Jason J. Cooper, Watertown, MA (US)

(73) Assignee: Harman International Industries, Incorporated, Northridge, CA (US)

( * ) Notice: Subject to any disclaimer, the term of this patent is extended or adjusted under 35 U.S.C. 154(b) by 1018 days.

(21) Appl. No.: 12/329,563

(22) Filed: Dec. 6, 2008

(65) Prior Publication Data

US 2010/0141585 A1 Jun. 10, 2010

(51) Int. Cl.
*G06F 1/16* (2006.01)

(52) U.S. Cl. .................. 361/679.21; 345/236; 312/327; 248/639

(58) Field of Classification Search .................. 345/468, 345/156, 168, 163, 236, 157, 175, 211, 177, 345/615; 312/327, 30, 236, 223.1, 27, 108, 312/249.13, 223.3; 248/442.2, 222.4, 205.3, 248/918, 278.1, 639, 123.11; 320/108, 109, 320/111, 132; 400/718; 206/305; 361/679.55, 361/679.21, 679.41, 679.4, 679.44, 679.08, 361/679.23, 679.33, 679.43, 679.37, 679.56, 361/679.47, 679.6, 679.59, 679.02, 679.22
See application file for complete search history.

(56) References Cited

U.S. PATENT DOCUMENTS

| | | | | |
|---|---|---|---|---|
| 6,109,585 | A * | 8/2000 | Burch, Jr. | 248/442.2 |
| 7,256,986 | B2 * | 8/2007 | Williams et al. | 361/679.55 |
| 2010/0148647 | A1 * | 6/2010 | Burgess et al. | 312/327 |

* cited by examiner

*Primary Examiner* — Hung Duong
(74) *Attorney, Agent, or Firm* — The Eclipse Group LLP

(57) ABSTRACT

A system and device for placement between a keyboard and monitor on a work surface that routes cables and provides access to controls, where the system and device rest in a first position for use and a second position for access to ports and cables.

21 Claims, 10 Drawing Sheets

MID-KEYBOARD-MONITOR COMPUTER-BASED AUDIO I/O DEVICE

BACKGROUND OF THE INVENTION

1. Field of the Invention

This invention relates generally to computer-based input/output devices. More particularly, the invention relates to access and control of input and output ports.

2. Related Art

A typical desktop computer has a keyboard, monitor and mouse that are connected to respective ports on the computer. Examples of such ports are VGA 15-pin connectors, universal serial bus (USB) connectors, and nine pin serial connectors. Audio connections are often made available in the computer for connections of speakers and microphones. It is not unusual for a computer user to have the monitor, keyboard and mouse on a work surface (such as a desk) and the computer or central processing unit (CPU) located on the floor under the work surface. By locating the computer under the work surface, cables are typically routed from below the work surface to the user or device located on the work surface. Another common work space configuration, places the monitor on top of the computer that is located on the work surface. Such an arrangement often requires cables to be routed from the back of the computer.

It is not uncommon for computer users to have additional devices that need to connect to the computer, such as MIDI music devices, serial ATA devices (hard disk drives and DVD/CD players), and other peripheral devices. Often these additional devices are used intermittently and require the user to go under the work surface to connect or "plug-in" the additional devices. Once the additional device is finished with, the user once again has to go under the work surface to disconnect the additional device. If the computer is located upon the work surface under the monitor, the computer and monitor often has to be turned to gain access to the rear ports of the computer.

Attempts have been made to make access to the computer ports easier. Some of these attempts have included adding USB hubs to monitors and keyboards, adding audio controls and ports to keyboards and placing connections at the front of the computer. But, problems still exist with these approaches. For example, if a keyboard is modified to have the additional ports the user is unable to use other keyboards that support such features as large letter keys, back lighting, and ergonomic designs.

The modification of a monitor suffers from the limited space for replicating ports within the monitor form factor. This limitation typically results in a very limited number of ports being replicated. A further problem with these approaches is accessing the ports may require the actually repositioning of the monitor or keyboard during connection to and disconnection, which is a major disruption of the work space. A further problem exists with cable routing when using these approaches.

Other approaches include port devices vertically standing or horizontal lying on a work surface and replicate some of the computer's ports. Such devices take up valuable work space when placed upon a work surface. Further, the cable routing is typically around the monitor and some times even interferes with the use of the keyboard.

It is well-recognized by persons skilled in the art that an ongoing need exists for providing improved designs for allowing access to computer ports remotely from the computer while providing routing for cables and ease of connecting and disconnection additional devices.

SUMMARY

According to one implementation, an audio input/output device that provides for cable management and access to visual information and controls. The placement of the audio input/output device between the computer and monitor makes use of an area on a user's work surface that is typically wasted. Further, the ability to conveniently route cables from the back and sides keeps the work surface neat and organized. The location of the audio input/output device between the keyboard and monitor is also an advantageous place to provide visual information to a user and to have controls readily accessible. Additionally, by being able to tilt the input/output audio device forward, access to ports and connections in the back of the input/output audio device are readily available without having to move monitors or other devices to connect and disconnect cables.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In general, the term "communicate" (for example, a first component "communicates with" or "is in communication with" a second component) is used in the present disclosure to indicate a structural, functional, mechanical, electrical, optical, magnetic, ionic or fluidic relationship between two or more components (or elements, features, or the like). As such, the fact that one component is said to communicate with a second component is not intended to exclude the possibility that additional components may be present between, and/or operatively associated or engaged with, the first and second components. Examples of implementations of the present subject matter will now be described with reference to FIGS. 1-20.

Figure 1:
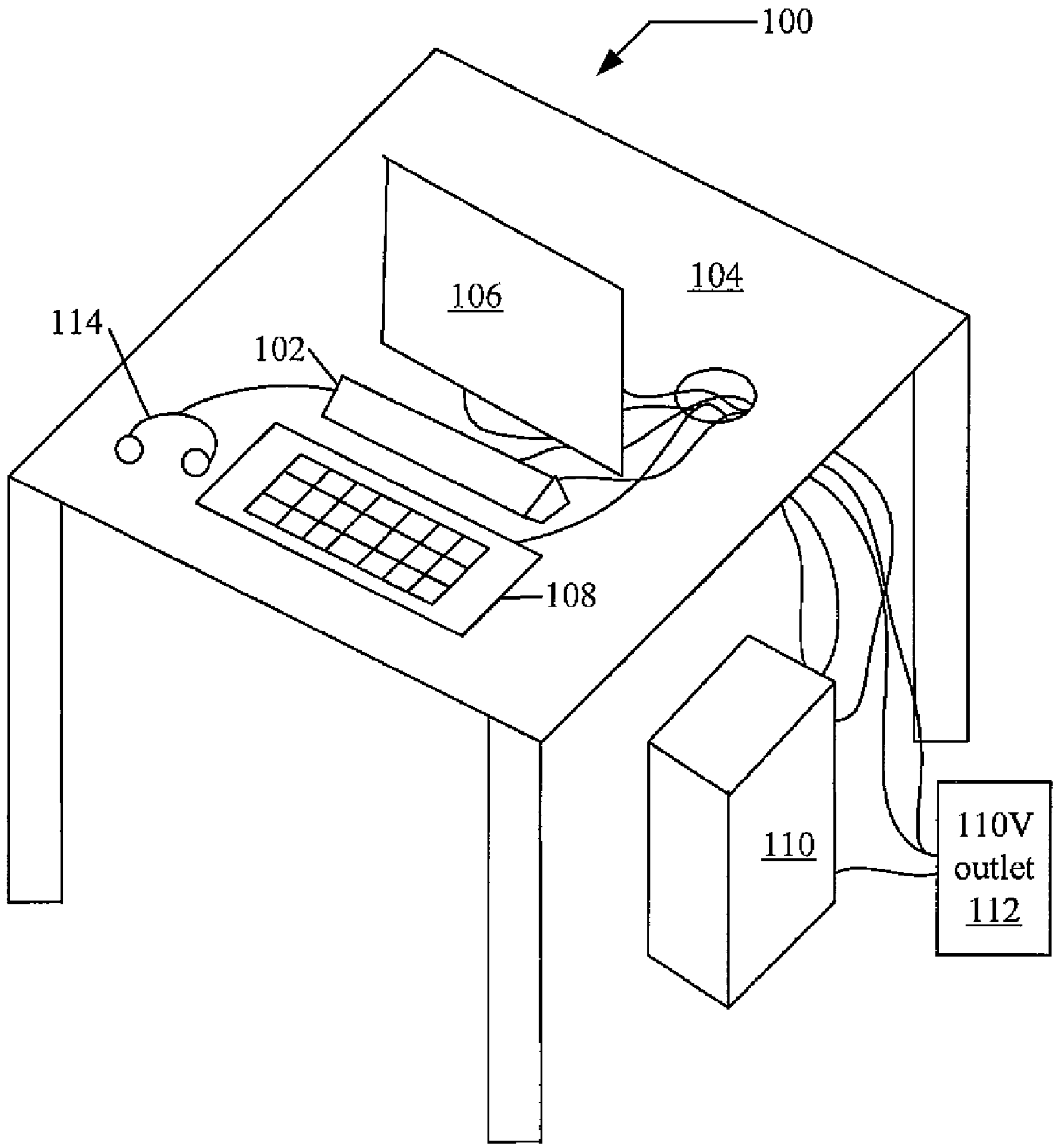
FIG. 1 is a diagram of an example implementation of a two channel Mid-Keyboard Monitor Audio Device (MKMAD) placed on a work surface between a monitor and keyboard.

In FIG. 1, a diagram 100 of an example implementation of a two channel Mid-Keyboard Monitor Audio Device (MKMAD) 102 placed on a work surface 104 between a monitor 106 and keyboard 108 is depicted. The MKMAD 102, monitor 106 and keyboard 108 are typically placed on a work surface 104 and connected to a computer 110 located under the work surface 104. In the current implementation, the MKMD 102 is powered via a 110 volt connection 112, but in other implementations the MKMAD 102 may be powered from a port on the computer, such as a universal serial bus (USB) port or a 110 voltage port located on the power supply of the computer 110. The MKMAD 102 may also be connected to other devices, for example musical instruments, sequencers, other computers directly or via networks, microphones, and headphones (such as headphone 114).

Figure 2:
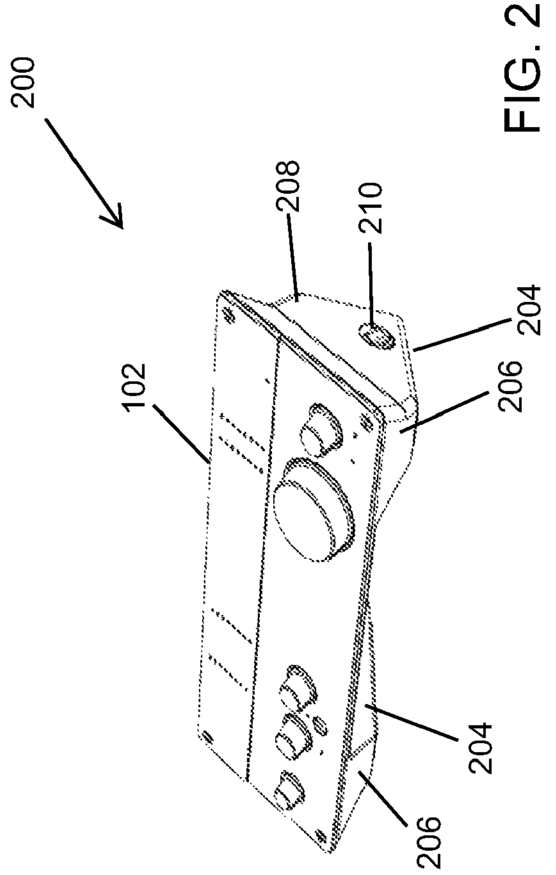
FIG. 2 is a perspective view illustration of the front of a two channel MKMAD of FIG. 2 that may be implemented.

Turning to FIG. 2, a perspective view illustration 200 of the front of a two channel MKMAD 102 of FIG. 1 that may be implemented is depicted. The front perspective view 200 shows a front surface or relatively flat surface 202 that is tilt up at an angle relative to the work surface. In the current implementation, the angle is shown to be approximately 45 degrees. In other implementations, any angle less than ninety degrees may be employed. The purpose for having the flat surface 202 at an angle relative to the work surface with a back edge higher than the front edge is to enable easy view of the two channel MKMAD 102 during operation by being below the front facing of the monitor 106 or other computer display. The user glance slightly lower than the monitor to see the relatively flat surface 202 of two channel MKMAD 102.

A bottom surface 204 may be flat and formed to enable the two channel MKMAD 102 to sit flat or in a first position on the work surface 104. The bottom surface may be implemented as a continuous flat plane or a surface with two or more flat portions within the bottom surface (such as the two 204's shown in FIG. 2). In other implementations, short legs or pegs may be used to support the two channel MKMAD 102 in the first position.

Another lower surface 206 is formed at an obtuse angle relative to the bottom surface 204. The lower surface 206 may be a single flat plane or a surface with two or more flat portions (two 206's are shown in FIG. 2). The lower surface 206 may engage the work surface 104 when the two channel MKMAD 102 is tilted forward to a second position. In the second position, the two channel MKMAD 102 has a port surface 208 that becomes easily accessible by the user with minimal cable displacement relative to moving the computer.

As seen FIG. 2, any number of controls, displays, and ports may be integrated into the different surfaces of the two channel MKMAD 102. The controls, displays, and ports are not limited to only being on the top or back of the two channel MIKMAD 102, but may also be place don the sides. For example the electronic instrument input 210 that enables an electric guitar to connected to the two channel MKMAD 102.

Figure 3:
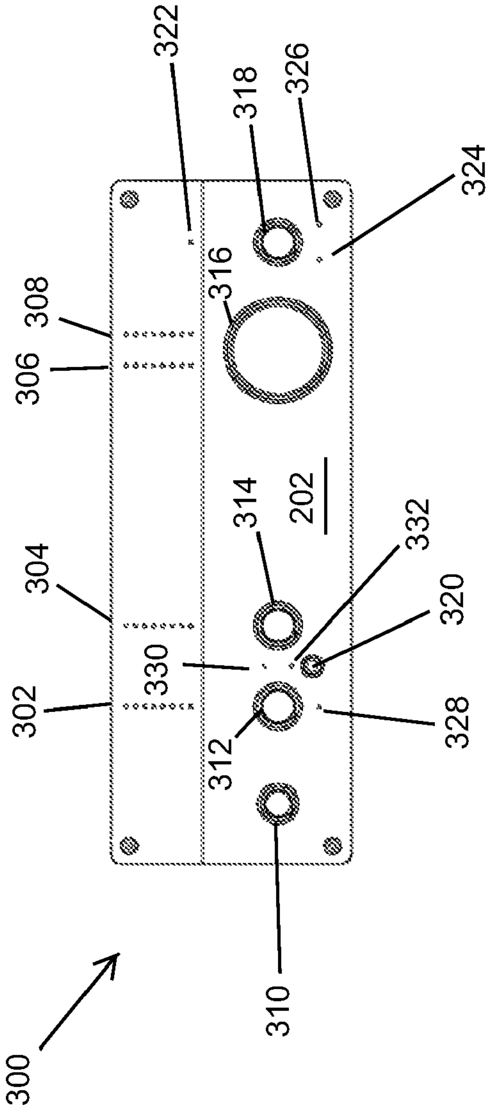
FIG. 3 is a top view illustration of the two channel MKMAD illustrated in FIG. 2.

In FIG. 3 a top view illustration 300 of the relative flat surface 202 of the two channel MKMAD 102 illustrated in FIG. 2 is depicted. The relative flat surface 202 may have visual information, such as LEDs 302, 304, 306, and 308, LCD displays, and lights; controls, such as switches, knobs 310, 312, 314, 316, and 318, ports, buttons such as 320, and sliders; in other implementations biometric readers, cameras, and microphones may also be included.

Fasteners 322, 324, 326, and 328 for fastening the relatively flat surface 202 to the other surfaces may be visible. Examples of fasteners may include screws, rivets, dowels, and clips, to give but a few examples. In other implementations, the relatively flat surface 202 by be glued to the other services, or secured in a manner that would not be visible on the relative flat surface 202. Also, in other implementations, the relative flat surface 202 may be of a different shape or combination of shapes that enable a user to easily view the two channel MKMAD 102 and access the controls contained on the two channel MKMAD 102.

The relatively flat surface 202 in the depicted example embodiment has a first channel input level meter LED display 302 and a second channel input level meter LED display 304. Each of the input level meter LED displays 302 and 304 are associated with a respective channel input volume control knob 312 and 314. A headphone volume control 310 may be used to control the volume level of headphones attached to the two channel MKMAD 102. The knob 316 may function as a stereo master volume control and have associated master volume level LEDs 306 and 308. An additional knob 318 may control the monitor output volume. A stereo/mono button 320 may be also available to select either two channel stereo or mono. Additional LEDs may also be visible through the relatively flat surface 202 to indicate things such as power 322, S/PDIF digital audio activity 324, USB activity 326, audio signal input LED 328 indicating a cable is connected to instrument port 210, +48 phantom power indicator shared between the two channels, and a stereo LED indicator 332.

Figure 4:
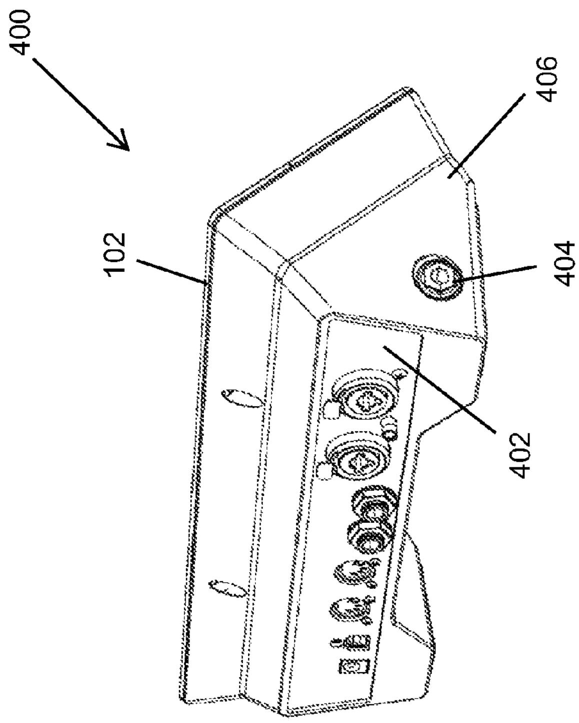
FIG. 4 is a perspective view illustration of the back of the two channel MKMAD of illustrated in FIG. 2.

Turning to FIG. 4, a perspective view 400 illustration of the back of the two channel MKMAD 102 of illustrated in FIG. 2 is depicted. The two channel MKMAD 102 may have a number of ports integrated into a back surface 402. The placement of ports in the back surface 402 that are adapted to receive different types of cables enables for easy cable routing around the sides of the computer case to the rear of the computer where the other ends of the cables may be connected. If the computer is located under the work surface, the cables may be routed back through the hole to the rear of the computer located under the work surface. On the left side surface 404 of the two channel MKMAD 102, a headphone port 404 is shown in FIG. 4.

Figure 5:
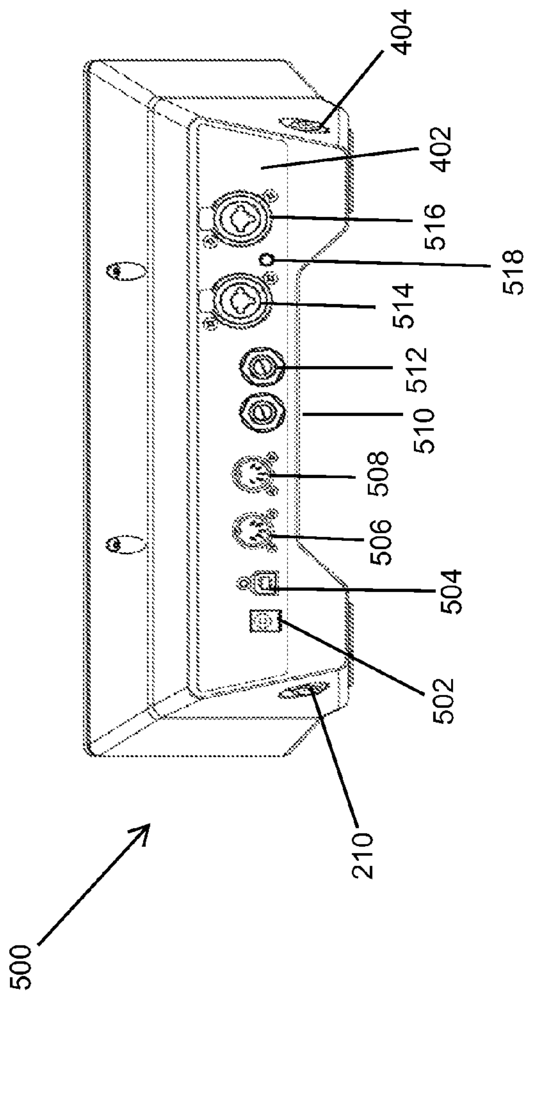
FIG. 5 is a back view illustration of the two channel MKMAD illustrated in FIG. 2.
Figure 6:
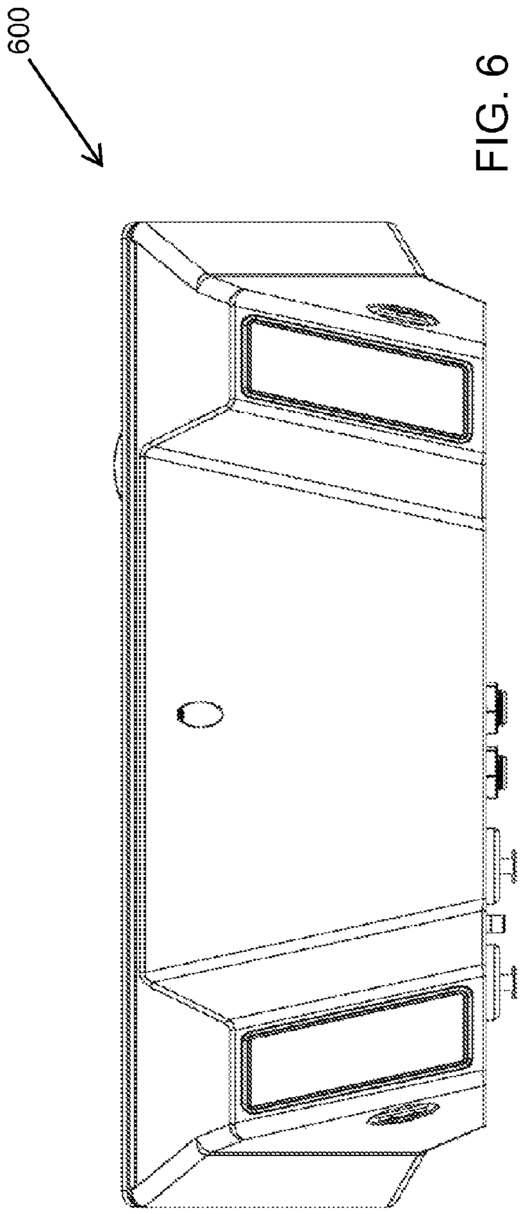
FIG. 6 is a bottom view illustration of the two channel MKMAD illustrated in FIG. 2
Figure 7:
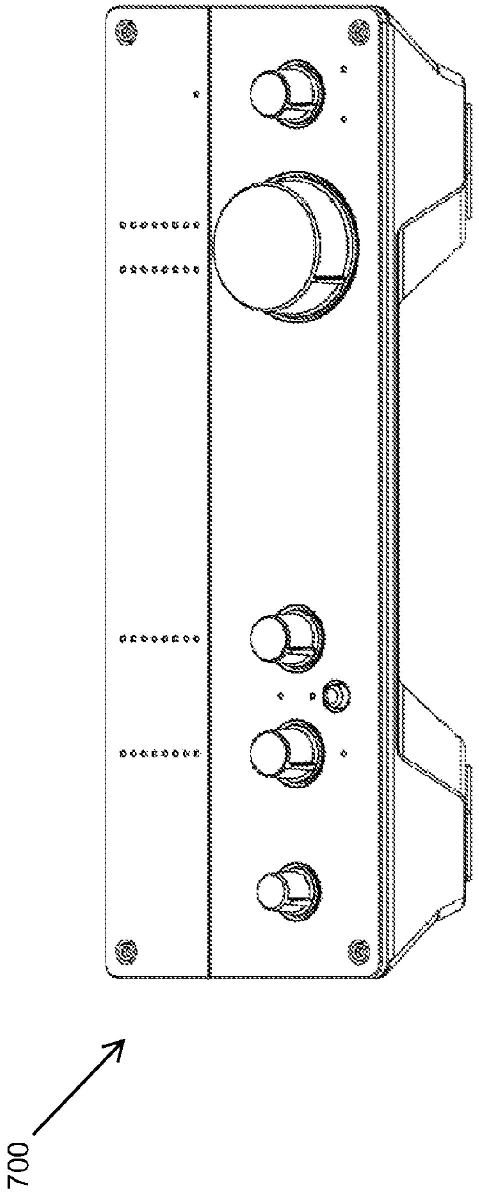
FIG. 7 is a front view illustration of the two channel MKMAD illustrated in FIG. 2
Figure 8:
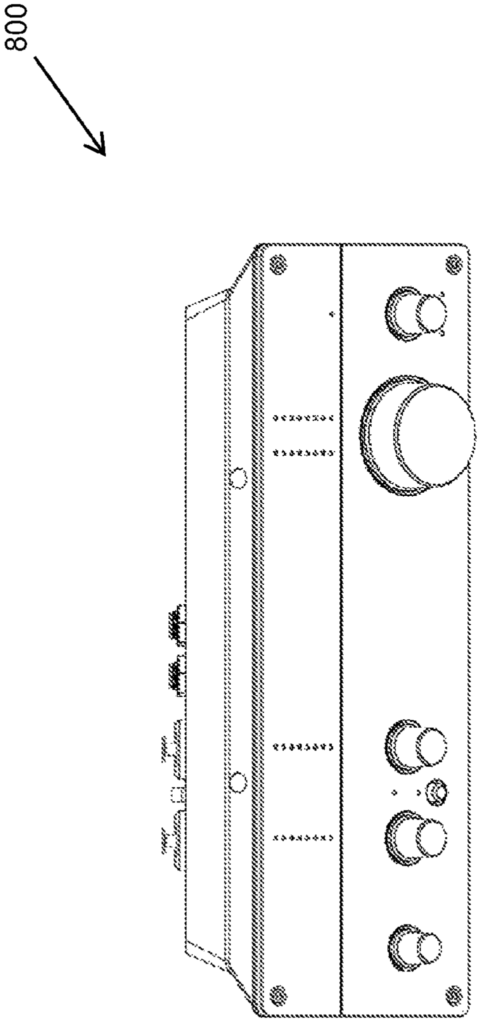
FIG. 8 is a top view illustration of the two channel MKMAD illustrated in FIG. 2
Figure 9:
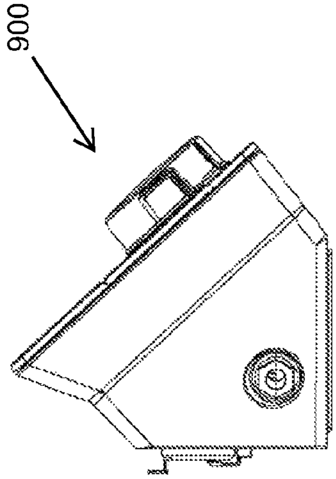
FIG. 9 is a left side illustration of the two channel MKMAD illustrated in FIG. 2.
Figure 10:
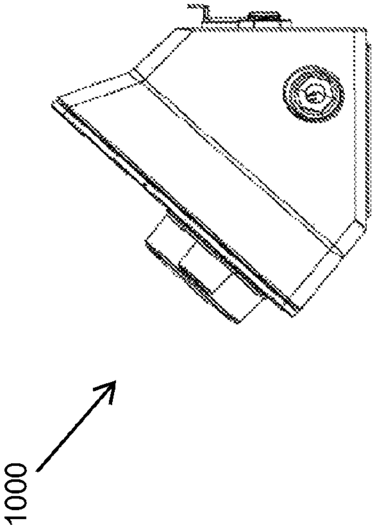
FIG. 10 is a right side illustration of the two channel MKMAD illustrated in FIG. 2.

In FIG. 5, a back view illustration 500 of the two channel MKMAD 102 illustrated in FIG. 2 is depicted. The side instrument input port 210 and headphone output port 404 may be visible when viewing the back of the two channel MKMAD 102. A power jack 502 is adapted to receive +48 volts DC. In other implementations, other voltage levels may be employed. A USB connector 504 may be found on the back of the two channel MKMAD 102 and is typically connected to a computer, MIDI input 506 and MIDI output 508 are typically used to connected digital musical devices such as electric keyboards, digital sequencers, and computers. The two channel MKMAD 102 may also be connected to other audio processing devices or sound boards via the right and left master outputs 510 and 512. Each of the two channels of the two channel MKMAD 102 may have an associated microphone/line input, such as 514 and 516. Switches may also be placed on the back surface 402 to assure easy access by a user, such as the phantom power switch 518. The ports, such as 510, 512, 514, and 516 may or may not be connected by cables directly to a computer, but still require easy access by the user while being easily routed away from the work surface.

In FIGS. 6-10, illustrations of the bottom 600, front 700, top 800, left side 900 and right side 10 of the example implementations of the two channel MKMAD 102 are shown. The example implementation is shown as only a two channel audio device, but other implementations are possible that include more channels than two channels. Furthermore, other types of devices besides audio devices, such as port replicators, LCD displays, relay displays, may be implemented that allow the device to have a first position and a second position located between a keyboard and monitor. In the first position a surface is easily seen by a user and in the second position; cables and switches are easily accessed by the user. In either position, cables are easily routed to avoid clutter on the work surface or interference with use of the keyboard or monitor.

The two channel MKMAD 102 may be molded out of plastic or other known moldable substances. The molded two channel MKMAD 102 may be molded as a single unit or multiple pieces that are assembled into a single unit. In the current implementations of the two channel MKMAD 102, the two channel MKMAD 102 may be structurally composed of a stamped sheet metal rear connector panel, die cast metal front and rear housings, die cast metal knobs, and molded elastomeric foot pads. In other implementations, the two channel MKMAD 102 may be formed out of mettle by molding or stamping and may be fabricated as one or more pieces. In yet other implementations, the two channel MKMAD 102 may be formed with a combination of metal and plastic.

Figure 11:
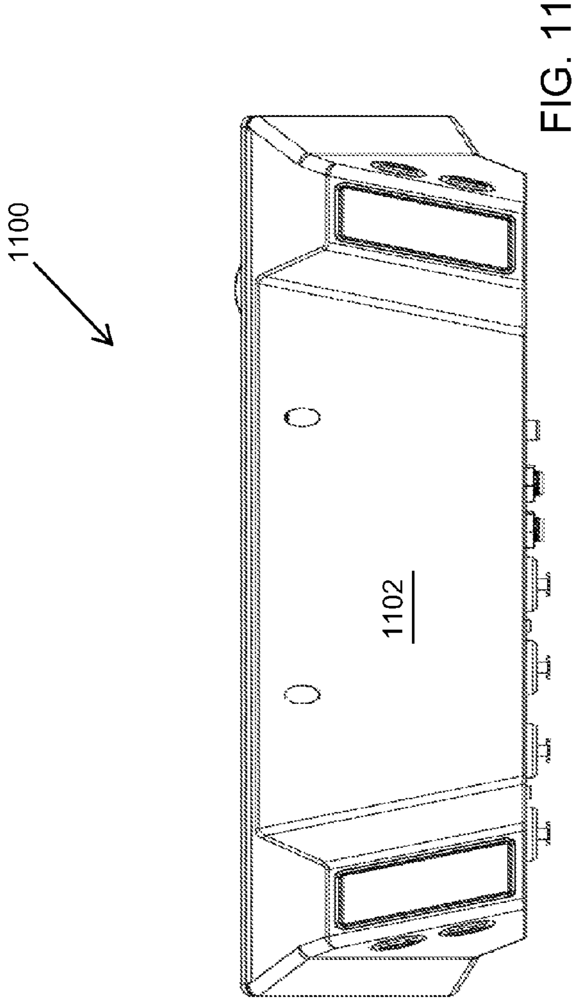
FIG. 11 is a bottom view illustration of an example implementation of a four channel MKMAD.

Turning to FIG. 11, a bottom view illustration 1100 of an example implementation of a four channel MKMAD 1102 is depicted. The shape of the four channel MKMAD 1102 is similar to the two channel MKMAD 102, only longer. The four channel MKMAD 1102 rests in the first position as with the MKMAD 102, and tilts forward to a second position to allow access to cables and ports.

Figure 12:
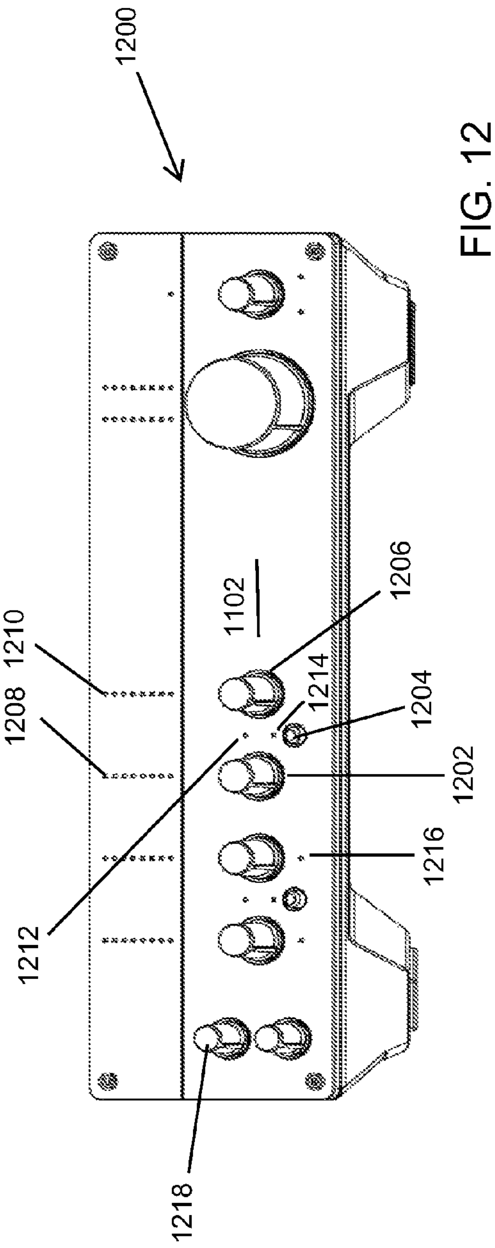
FIG. 12 is a front view illustration of the four channel MKMAD illustrated in FIG. 11.
Figure 13:
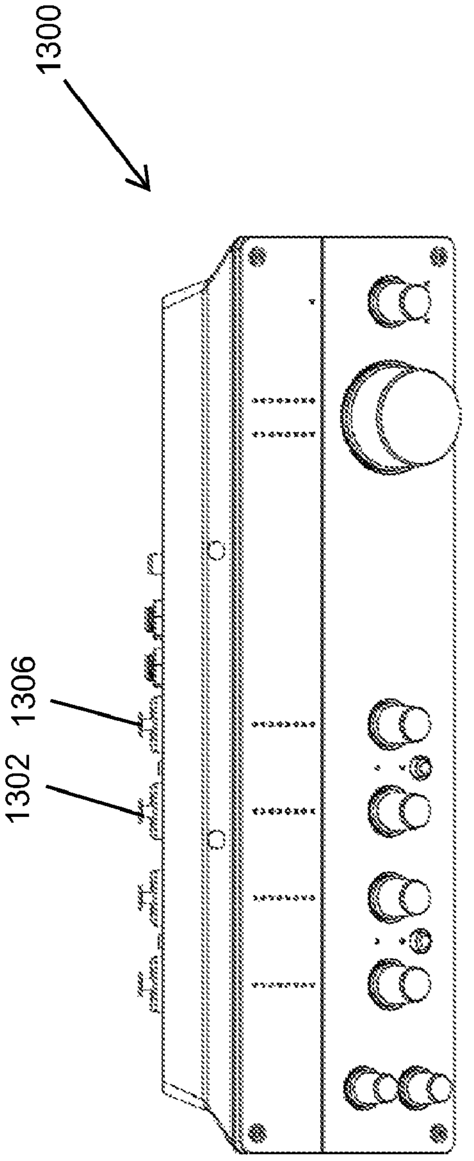
FIG. 13 is a top view illustration of the four channel MKMAD illustrated in FIG. 11.

In FIG. 12, a front view illustration 1200 of the four channel MKMAD 1102 illustrated in FIG. 11 is depicted. In the front view an additional knobs 1202 and 1204 are shown along with another stereo mono button 1206. Each of the additional channels also may have an associated input channel level meter 1208 and 1210. Additional LEDs for indicating phantom power 1212, stereo/mono 1214, and second instrument input indicator 1216 are visible in illustrations 1200. An additional knob for controlling a second headphone output volume 1218 is also shown. These additional controls are also visible in FIG. 13; which is a top view illustration 1300 of the four channel MKMAD illustrated in FIG. 11. In the top view illustration 1300, two additional microphone/line inputs 1302 and 1306 may be seen for channels 3 and 4 of the four channel MKMAD 1102.

Figure 14:
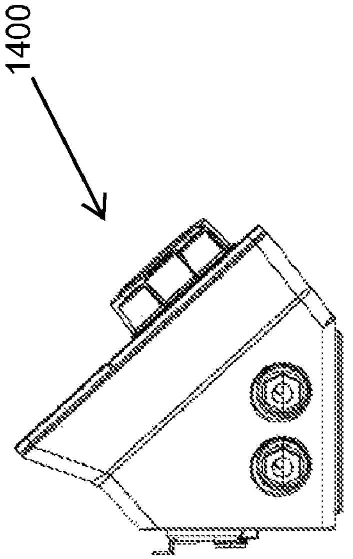
FIG. 14 is a left side illustration of the four channel MKMAD illustrated in FIG. 11.
Figure 15:
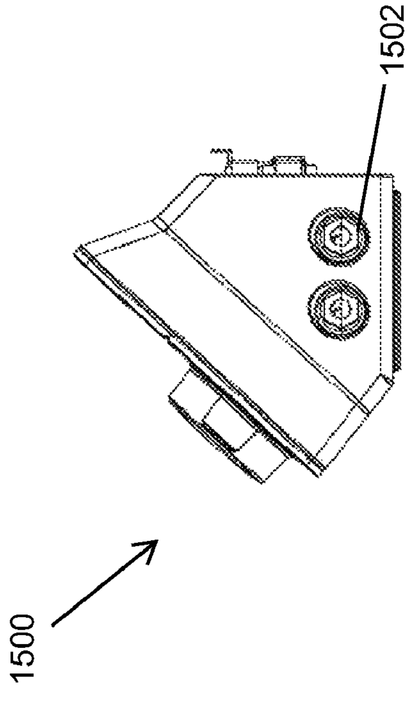
FIG. 15 is a right side illustration of the four channel MKMAD illustrated in FIG. 11.

Turning to FIG. 14 a left side illustration 1400 of the four channel MKMAD 1102 illustrated in FIG. 11 is depicted. An additional headphone output port may be added to the four channel MKMAD 1102 with associated circuitry to control the volume of the second headphone output signal via knob 1218. Similarly, another port has been added in the right side 1500 of the four channel MKMAD 1102 as seen in FIG. 15. The additional port is a second instrument input 1502 and is associated with the second instrument input indicator LED 1216.

Figure 16:
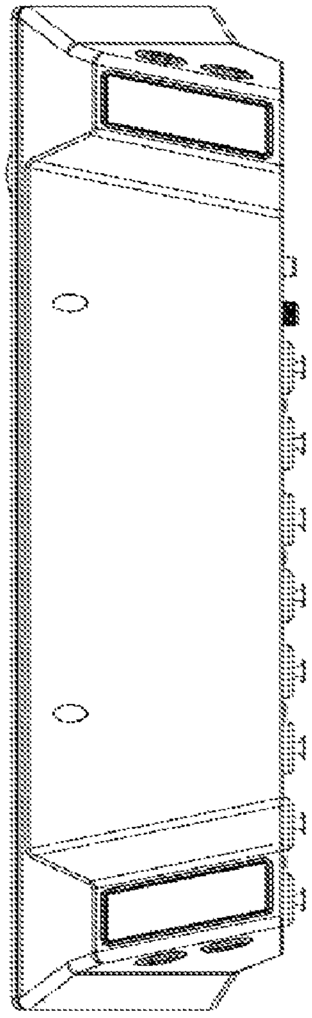
FIG. 16 is a bottom view illustration of an example implementation of an eight channel MKMAD.
Figure 17:
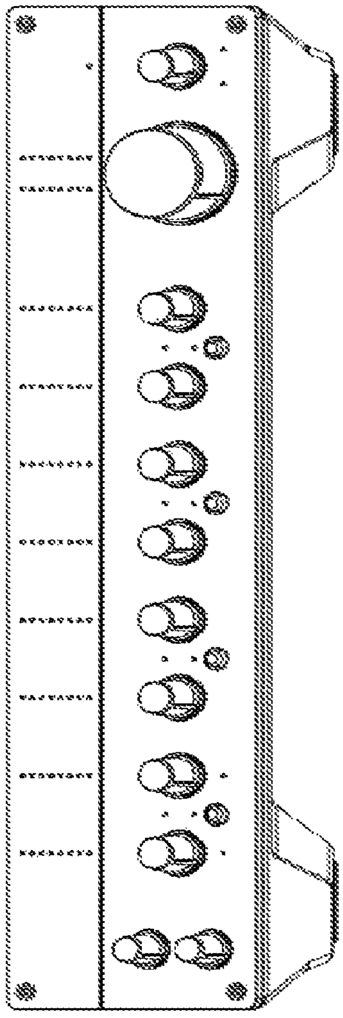
FIG. 17 is a front view illustration of the eight channel MKMAD illustrated in FIG. 16.
Figure 18:
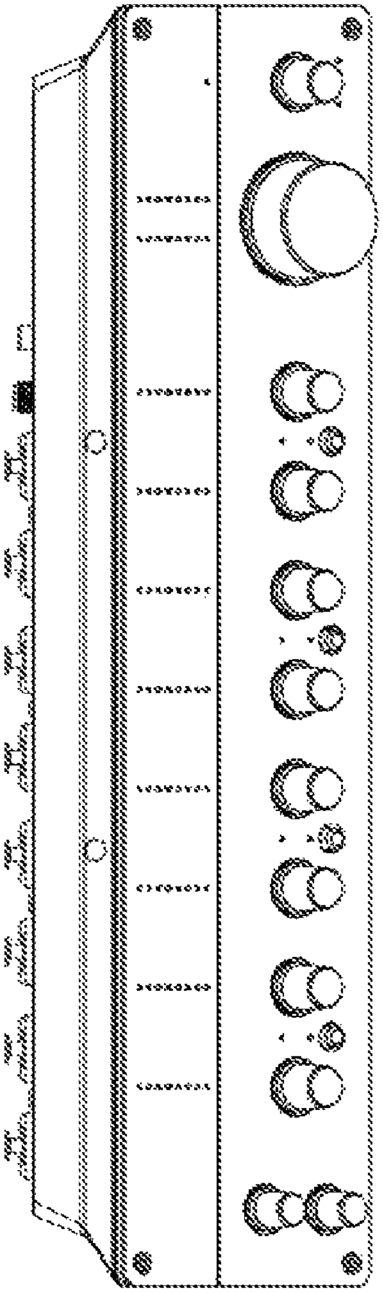
FIG. 18 is a top view illustration of the eight channel MKMAD illustrated in FIG. 16.
Figure 19:
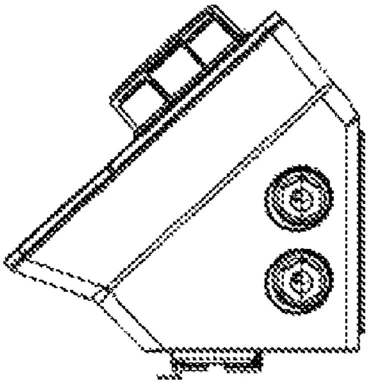
FIG. 19 is a left side illustration of the eight channel MKMAD illustrated in FIG. 16.
Figure 20:
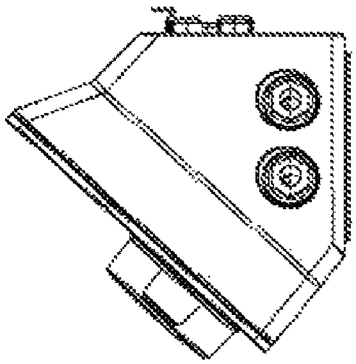
FIG. 20 is a right side illustration of the eight channel MKMAD illustrated in FIG. 16.

In FIG. 16 is a bottom view illustration 1600 of an example implementation of an eight channel MKMAD is depicted. Similar to the two and four channel MKMAD 102 and 1102, the eight channel has controls and input for eight microphones/line inputs and associated controls as shown in FIGS. 17-20.

Figure 21:
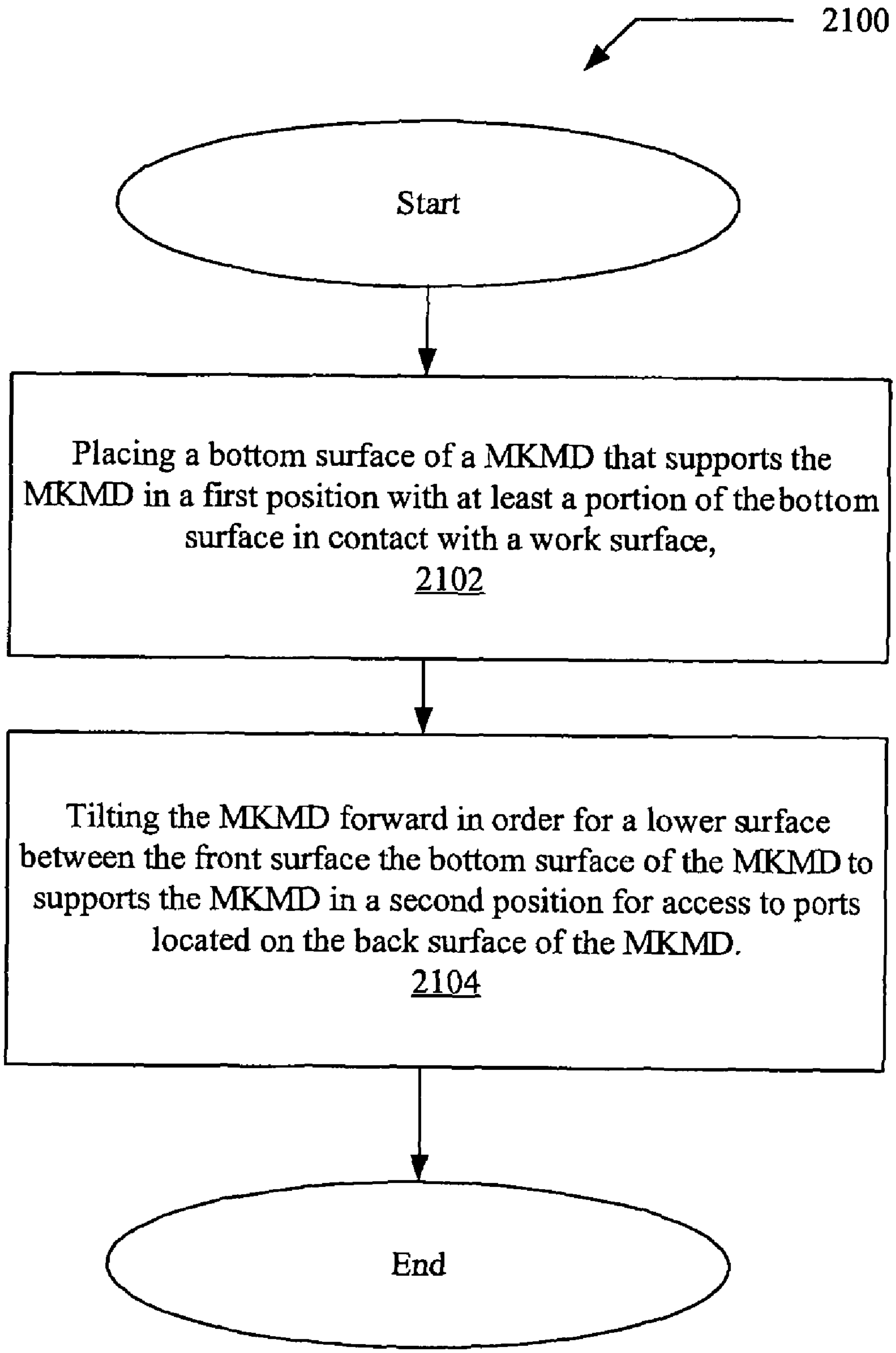
FIG. 21 is a flow diagram of the procedure for using the two channel MKMAD illustrated in FIG. 1.

In FIG. 21, a flow diagram 2100 of the procedure for using the two channel MKMADs illustrated in FIG. 1 is depicted. The procedure starts with the two channel MKMAD 102 in a first position 2102 allowing the user to easily view the two channel MKMAD 102. The user also has easy access to the controls located on the two channel MKMAD 102. The two channel MKMAD 102 may then be tilted forward 2104 to a second position in order to allow access to the ports and cables in the back of the two channel MKMAD 102. Once finished with accessing the ports and cables, the two channel MKMAD 102 may be returned to the first position.

It can thus be seen that the implementations disclosed herein offer significant flexibility in design and use. An audio input/output device has been described as and example implementation, but other implementations that have cables or visual information may be used in the audio input/output devices or in place of audio input/output devices. The placement of the MKMAD 102 between the computer and monitor makes use of and area of a user's work surface that is typically wasted. Further, the ability to conveniently route cables from the back and sides of the MKMAD 102 keeps the work surface neat and organized. Cables from the back are routed backward and cables connected to the side ports may be routed around the keyboard.

The location between the keyboard and monitor is also an advantageous place to provide visual information to a user and to have controls readily accessible. Additionally, by being able to tilt the MKMAD 102 forward, access to ports and cables that connect to the back of the MKMAD 102 are readily available without having to disrupt other cables, move monitors or other devices in order to connect and disconnect cables.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A mid-keyboard-monitor device (MKMD), comprising:

a bottom surface of the MKMD that supports the MKMD in a first position on a work surface;

a front surface of the MKMD having a front edge and a back edge, where the front surface is inclined at an angle less than ninety degrees relative to the bottom surface with the back edge being higher than the front edge;

a lower surface between the front surface the bottom surface of the MKMD, that supports the MKMD in a second position.

2. The MKMD of claim 1, includes a back surface located between the bottom surface and the front surface, where the back surface has at least two ports.

3. The MKMD of claim 2, where one of the at least two ports is a line in port.

4. The MKMD of claim 3, where a second of the at least two ports is a master output port.

5. The MKMD of claim 1, includes a side surface connected to the front surface, bottom surface and lower surface.

6. The MKMD of claim 5, where the side surface further includes an electrical port.

7. The MKMD of claim 6, where the electrical port is a headphone output port.

8. The MKMD of claim 6, where the electrical port is an instrument input port.

9. The MKMD of claim 1, where the front surface further includes at least one visual indicator.

10. The MKMD of claim 9, where the at least one visual indicator is a LED.

11. The MKMD of claim 9, where the at least one visual indicator is a LCD display.

12. The MKMD of claim 1, where the front surface further includes at least one knob.

13. The MKMD of claim 12, where the at least one knob is a volume control.

14. The MKMD of claim 13, where the MKMD is in receipt of at least one audio signal and modifies the at least one audio signal in response to the volume control.

15. The MKMD of claim 1, where the MKMD has at least one port that is coupled to a computer.

16. The MKMD of claim 15, where the at least one port is a universal serial bus port.

17. The MKMD of claim 1, where the bottom surface has at least two portions that are adapted to engage the work surface.

18. The MKMD of claim 1, where the bottom surface is at least two legs that engage the work surface.

19. The MKMD of claim 1 where the bottom surface is molded plastic.

20. The MKMD of claim 1 where the front surface is molded plastic.

21. A method of mid-keyboard-monitor cable management with a mid-keyboard-monitor device (MKMD), comprising:

placing a bottom surface of a MKMD that supports the MKMD in a first position with at least a portion of the bottom surface in contact with a work surface, with a front surface of the MKMD having a front edge and a back edge, where the front surface is inclined at an angle less than ninety degrees relative to the bottom surface with the back edge being higher than the front edge; and tilting the MKMD forward in order for a lower surface between the front surface the bottom surface of the MKMD to supports the MKMD in a second position for access to ports located on the back surface of the MKMD.

* * * * *